Feb. 26, 1952 C. W. CHESTER 2,587,115
EXHAUST PIPE EXTENSION OF DEFLECTOR FORM
Filed April 11, 1949 2 SHEETS—SHEET 2
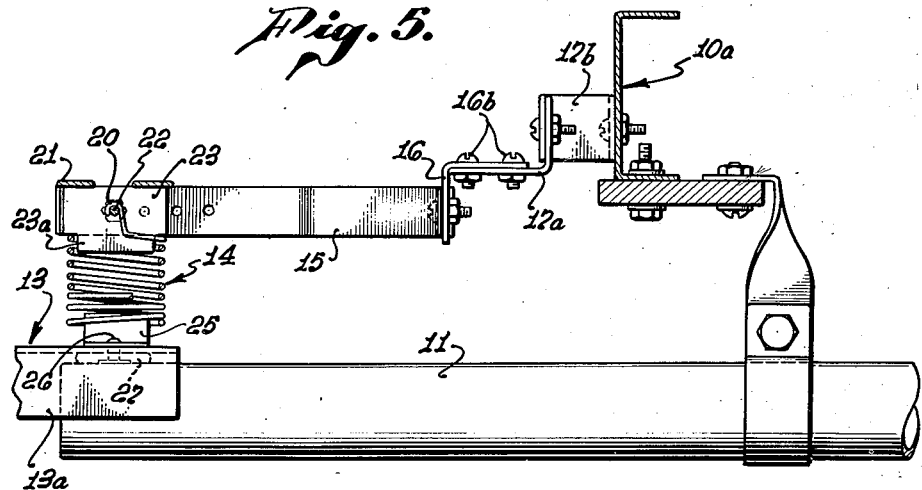
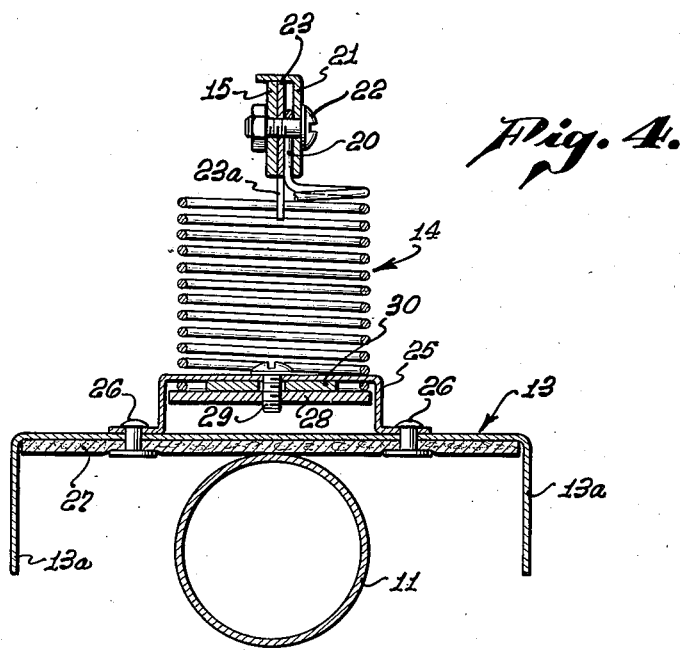
INVENTOR.
CARROLL W. CHESTER,
By Barkelew & Shackleburg
ATTORNEYS.

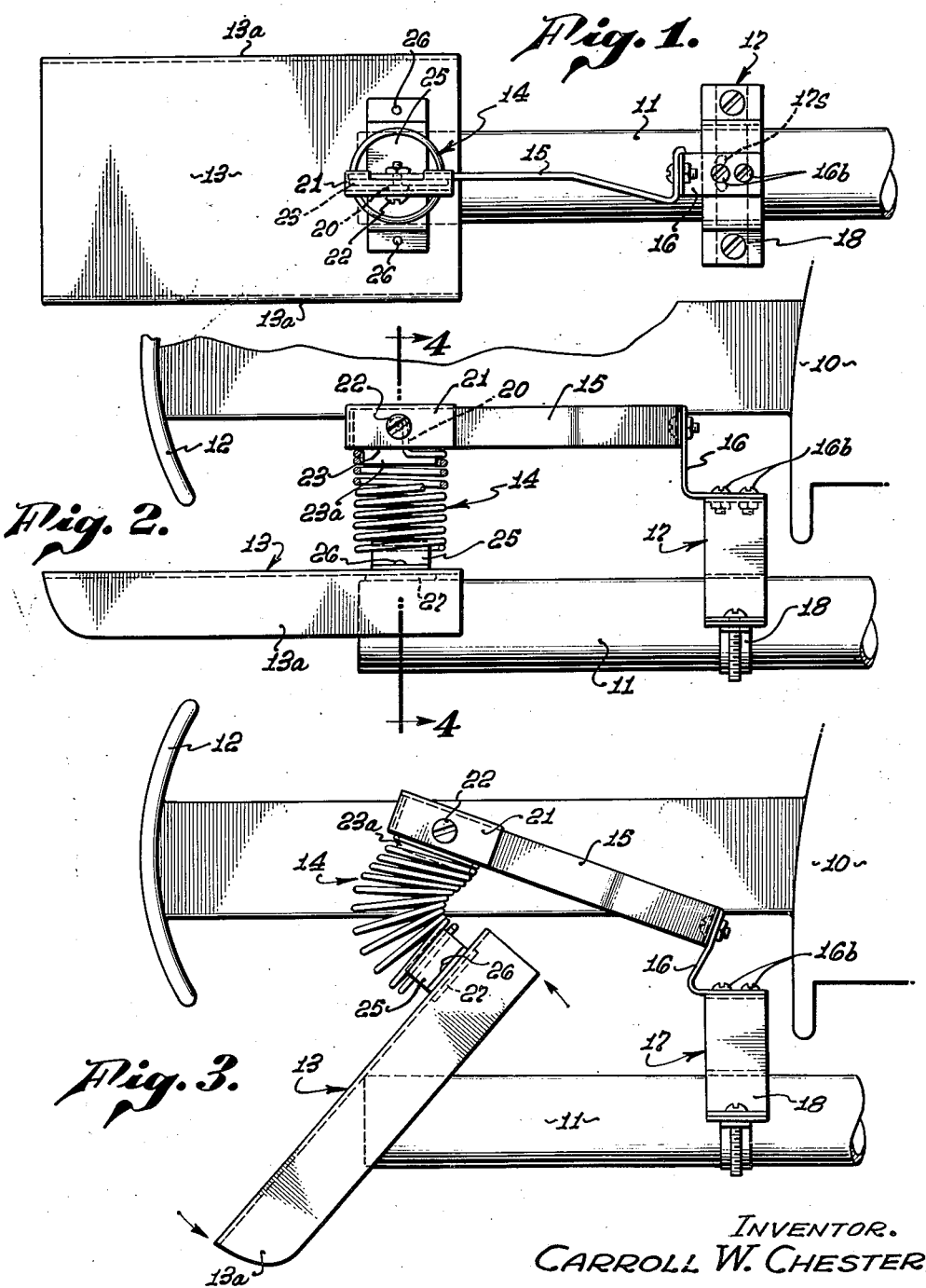

Patented Feb. 26, 1952

2,587,115

UNITED STATES PATENT OFFICE 2,587,115

EXHAUST PIPE EXTENSION OF DEFLECTOR FORM

Carroll W. Chester, Los Angeles, Calif.

Application April 11, 1949, Serial No. 86,772

11 Claims. (Cl. 138—46.5)

This invention relates to the general subject matter of extensions for the exhaust or tail pipes of automobiles; the general purpose of the invention being to guide the exhaust gases rearwardly past the rear bumper and at the same time to be proof against damage to itself and also to protect the exhaust pipe from damage if the extension is forcibly contacted.

In my previously filed applications, Serial No. 584,309, filed March 23, 1945, now Patent No. 2,489,480, dated November 29, 1949, and Serial No. 667,615, filed May 6, 1946, now Patent No. 2,489,481, dated November 29, 1949, I have provided a tubular extension structure which is movable forwardly on the exhaust pipe when subjected to a forwardly directed force, and which is flexible laterally under any lateral forces that may be imposed on the extension. That type of structure successfully performs the desired functions, but has been found to be relatively expensive in manufacture.

One of the particular objects of the present invention is to provide an extension device which will guide the exhaust gases rearwardly past the bumper and have the same protective qualities as my previous tubular extensions, but which is less expensive to make. The invention satisfies that objective by providing a very simple structure involving a deflector pan which has a normal position extending rearwardly in a plane above the exhaust pipe, and which is mounted by a simple yielding mounting on the exhaust pipe or any suitable frame member of the automobile. The simple mounting is such that the deflector is universally movable under imposed forces so as to be itself protected against damage and so as to impose no damaging forces on the exhaust pipe.

Preferred and illustrative embodiments of the invention are shown in the drawings; in which, Fig. 1 is a plan showing a preferred embodiment of the invention;

Fig. 2 is a side elevation of the parts shown in Fig. 1 and also showing the typical relative locations of the automobile body and rear bumper;

Fig. 3 is a similar elevation showing one of the displaced positions of the deflector pan;

Fig. 4 is a section on line 4—4 of Fig. 2; and

Fig. 5 is a side elevation, with certain parts in section, showing a modified mounting of the device on the car body rather than directly on the exhaust pipe as in Figs. 1 to 3.

The drawings show portions of an automobile structure, including body 10 (in Fig. 5 a part 10a which illustrates a part of the frame), tail pipe 11 and rear bumper 12.

Deflector pan 13 in its normal position of Figs. 1 and 2 lies with its forward end over the rear end of pipe 11. Resilient element, such as the coiled compression spring 14 is attached at its lower end to the forward end of pan 13, and is mounted at its upper end on the rear end of a bar 15. That bar 15 has its forward end mounted, through a flat spring 16, on the automobile structure. Figs. 1 to 3 show spring 16 mounted on a suitable bracket 17 attached to the tail pipe of the automobile structure by a clamp 18; Fig. 5 shows flat spring 16 mounted, by brackets 17a and 17b on frame member 10a of the automobile structure.

The drawings show a tail pipe which projects straight rearwardly. Some tail pipes however are bent laterally at their rear end, and the mounting of spring 16 on bracket 17 (Fig. 1) or on bracket 17a (Fig. 5) is designed for adjustment to accommodate any such bend. For instance spring 16 is shown as secured to bracket 17 or 17a by two bolts 16b. One of those bolts passes through a slot 17s in bracket 17, the slot allowing adjustment of the direction in which arm 15 and deflector 13 project so as to properly overlie a laterally bent tail pipe. And if the rear end of the tail pipe is bent down at its rear end (beyond clamp 17 in Figs. 1 and 2) the angle of flat spring 16 may be changed so as to hold arm 15 normally in a position substantially parallel to the rear end of the tail pipe.

The connection of the coiled compression spring 14 to pan 13 and bar 15 may be in any suitable manner, but the preferred connecting arrangements are shown in Fig. 4. The upper end of the spring is formed into a loop or eye 20 in a vertical plane. That loop is clamped between the vertical side face of bar 15 and a clamping plate 21, by action of a bolt 22. An intermediate plate 23 (see also Fig. 5) seats on the uppermost spring coil and has the extension 23a which fits down inside the upper coil. The effect of the mounting is to rigidly connect the upper end of the spring to bar 15. The lower end of the spring is rigidly connected to the pan 13 preferably by such a structure as shown also in Fig. 4. A bracket 25 is rigidly attached to the pan, as by rivets 26 which pass through a bar 27 on the under face of the pan. One lowermost coil of the spring is inserted under the bracket, and a clamping plate 28 and screw 29 clamp the coil upwardly against the under face of the bracket. A washer 30 may be interposed. The lower end of spring 14 is thus rigidly but adjustably connected to the pan 13. By loosening screw 29, the pan can be adjustably swung in plan about the vertical axis of spring 14 and secured in such adjusted position to overlie a short bend at the end of the tail pipe. This adjustment, together with the adjustments before mentioned, make the mounting easily adaptable to hold the pan in best position over any tail pipe.

Pan 13 is shown as generally flat with depending side flanges 13a for the confinement of the exhaust gases to a stream under the pan when in the normal position of Fig. 1, where the rear end of the pan projects beyond the bumper. Instead of being flat with side flanges the pan might be of curved section, in the aspect seen in Fig. 4, and perform its function substantially as well as in the form shown. The flanges or downwardly turned side edges also have the function of preventing the pan from being shoved laterally off of the tail pipe.

The specifically preferred form of the invention which has been described operates as follows. In its normal position the forward end of the deflector pan overlies and is pressed down on the rear end of the tail pipe by the spring mounting. The bar 27 directly contacts the tail pipe and is preferably of a sound deadening material, such for instance as reinforced asbestos or an impregnated fire-proof fabric. If in any circumstance a forward force is imposed on the pan it either slides directly forward over the tail pipe, or it moves forward and into a tipped position such as shown in Fig. 3. In either of these positions spring 14 is flexed in a fore and aft plane, laterally of its own vertical axis. And in the tipped position of Fig. 3, mounting spring 16 is also flexed, arm 15 moving up to such a position as illustrated; and spring 14 is also compressed vertically. If a down force is imposed on the rearwardly projecting end of the deflector, it again moves to a position similar to that of Fig. 3.

If the rearward end of the deflector is struck in a lateral direction, the rear end swings around, substantially about the vertical axis of spring 14, distorting the spring torsionally about the axis. If the rear end is struck diagonally, the movement may partake of both the horizontal swinging and forward or tipping move on the tail pipe. And if under any circumstances the deflector is struck laterally near its forward end, it simply moves laterally of the tail pipe, distorting spring 14 laterally. On relief from any of the displacing forces the spring mounting immediately returns the deflector to normal position.

It may be remarked that substantially the same movements of the deflector will take place if the upper end of the spring 14 is mounted rigidly instead of on the spring mounted arm. That is, the spring at 16 could be replaced by a rigid bracket. The function of that spring, allowing arm 15 to move up, is to give greater flexibility to the mounting system without the necessity of using a spring 14 considerably longer than that shown.

Spring 14 is illustrative of any similarly acting resilient element, such for instance as a rubber block of suitable proportions and dimensions. The metal coiled spring however is preferred.

The foregoing describes my present preferred form of resilient mounting for the deflector. But, as I have indicated, spring 16 and its function may be omitted, all of the functions then being performed by the single resilient element 14. As shown, I prefer to arrange that spring with its axis normally vertical, but any other relative placement of the resilient element which allows the necessary displacement movements may be used. The necessary or desired displacement freedoms and corresponding resilient flexibilities of the resilient mounting, can be generally described as freedom of the deflector for universal movement, in any direction, in a horizontal plane so that the deflector can move forwardly or laterally; and freedom for its rear end to swing laterally about a vertical axis in the mounting. Additionally it is preferably desirable that the deflector have resiliently opposed freedom to tip (as in Fig. 3) about a horizontal axis at the end of the tail pipe so as to minimize the forward movement necessary to locate the rear end of the deflector as far forward as the rear bumper.

In the foregoing description I have treated of the tail pipe as projecting horizontally and therefore of the deflector pan as being in a normal horizontal position projecting rearwardly from the tail pipe. These directions of extent or projection need not be, and in many instances are not strictly horizontal. For instance, many tail pipes project diagonally downwardly and rearwardly, and in such cases the pan, bearing the same relation as illustrated to the tail pipe will also project diagonally downwardly and rearwardly instead of strictly horizontally. And if the relation of arm 15 and spring 14 to a sloping tail pipe is the same as the relation shown in Fig. 2, arm 15 will be correspondingly inclined and the axis of spring 14 will not be strictly vertical. And furthermore it may be remarked that arm 15 is not necessarily parallel to the tail pipe, as will be readily understood; nor is the axis of spring 14 necessarily at right angles to either the tail pipe or the arm 15, or strictly vertical. Generally in using the terms "horizontal," "vertical" and other such directional terms, I therefore do not intend to mean extents or projections strictly in such directions, but extents or projections generally, or having components, in such directions; and the following claims are to be read with such meanings in mind.

I claim:

1. An extension for the rear end of a tail pipe of an automobile structure, said extension comprising a generally flat pan adapted normally to lie in a position projecting rearwardly of the rear end of the tail pipe and with its forward end overlying the rear end portion of the pipe, a resiliently distortible element connected to the forward end portion of the pan and normally resiliently pressing the forward end of the pan down on the pipe and allowing, by its resilient distortability, universal rotative and translational movements of the pan in its normal plane, and means for attaching the resiliently distortible element to the automobile structure.

2. An extension as defined in claim 1, and in which the resiliently distortible element consists of a single member which is resiliently distortible laterally of and in compression along a longitudinal axis and in torsion about said axis, said member having its axis normally in a substantially vertical position, the lower end of said member being rigidly attached to the forward end portion of the pan, and said member being held normally in vertical compression by the means attaching it to the automobile structure so as to resiliently press the forward end portion of the pan down on the tail pipe.

3. An extension as defined in claim 2, and in which the upper end of the resiliently distortible member is rigidly connected to the means which attaches it to the automobile structure.

4. An extension as defined in claim 3, and in which the resiliently distortible member is a helical coiled spring.

5. An extension as defined in claim 1, and in which the attaching means includes an arm adapted to be mounted at one end on the automobile structure, the resiliently distortible element is in the form of a coiled spring positioned normally on a substantially vertical axis, the lower end of the spring being rigidly affixed to the forward end portion of the pan and the upper end of the spring being rigidly attached to the arm.

6. An extension as defined in claim 5 and in which the attaching means also includes a spring through which the arm is mounted on the automobile structure.

7. An extension for the rear end of a tail pipe of an automobile structure, said extension comprising an exhaust guiding member adapted normally to lie in a position projecting rearwardly of the rear end of the tail pipe and with its forward end overlying the rear end portion of the pipe, a coiled helical spring having its lower end rigidly attached to the forward end portion of the guiding member, and bearing down thereon to normally hold that portion of said member seated on the tail pipe, and means for connecting the upper end of the spring to the automobile structure, said means holding the spring in vertical compression and holding the upper end of the spring rigidly as regards rotational movement about the spring axis.

8. An extension as defined in claim 7 and in which the connecting means includes an arm, and resilient means for mounting the arm on the automobile structure.

9. An extension as defined in claim 8 and in which the guiding member has down-turned longitudinal side edges which laterally overhang the tail pipe.

10. An extension as defined in claim 7 and in which the guiding member has down-turned longitudinal side edges which laterally overhang the tail pipe.

11. An extension as defined in claim 1 and in which the pan has down-turned longitudinal side edges which laterally overhang the tail pipe.

CARROLL W. CHESTER.

REFERENCES CITED

The following references are of record in the file of this patent:

UNITED STATES PATENTS

| Number | Name | Date |
|---|---|---|
| 816,897 | Brey | Apr. 3, 1906 |
| 2,459,918 | Chester | Jan. 25, 1949 |
| 2,466,307 | Di Renna | Apr. 5, 1949 |